Sept. 3, 1968     O. N. LAWRENCE     3,399,529
FUEL FLOW CONTROL APPARATUS FOR GAS TURBINE ENGINES
Filed March 17, 1967
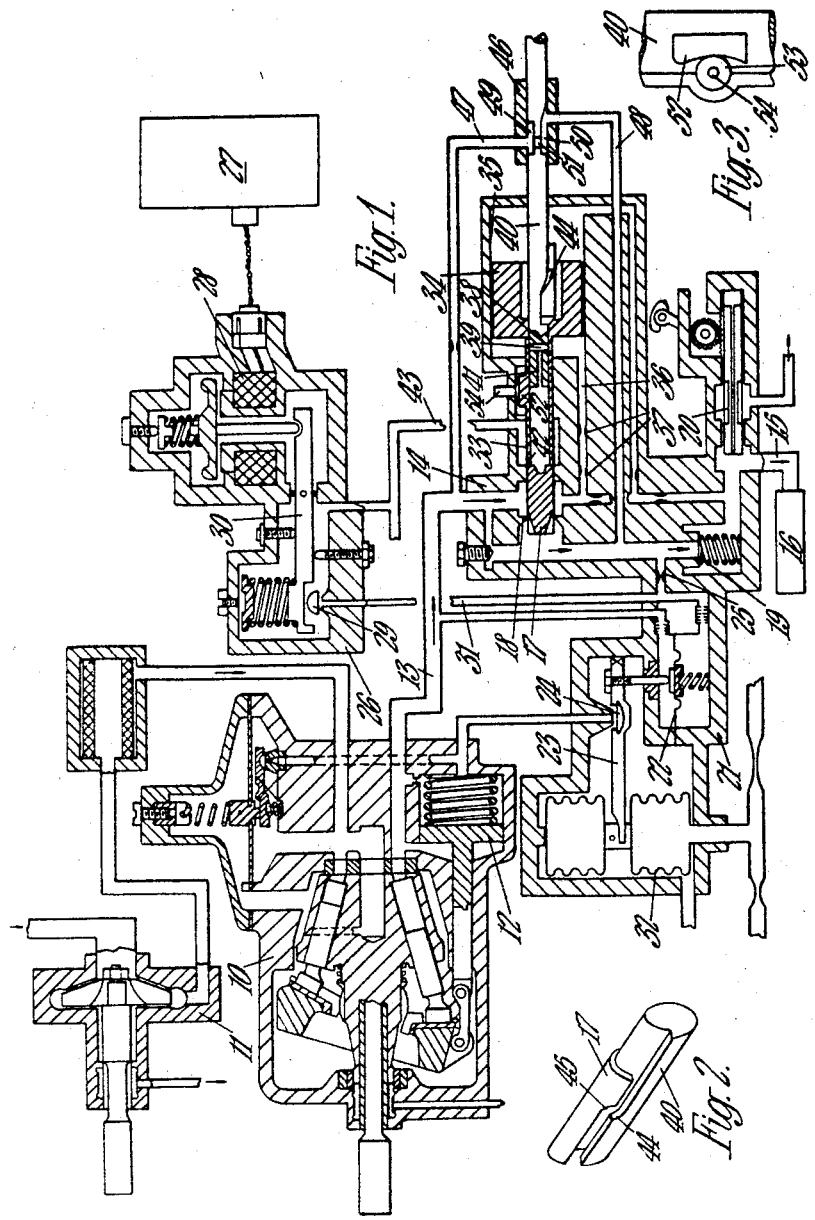

United States Patent Office 3,399,529
Patented Sept. 3, 1968

3,399,529
FUEL FLOW CONTROL APPARATUS FOR GAS TURBINE ENGINES
Owen Napier Lawrence, London, England, assignor to Joseph Lucas (Industries) Limited, Birmingham, England
Filed Mar. 17, 1967, Ser. No. 623,997
4 Claims. (Cl. 60—39.28)

ABSTRACT OF THE DISCLOSURE

Apparatus for controlling fuel supply to a gas turbine engine and comprising a pump, a throttle controlling flow from the pump to an engine, the throttle being connected to a piston within which is slidably mounted a manually controlled plunger, the axial position of which relatively to the piston controls escape of fuel from the cylinder in which the piston is mounted, through an orifice in the piston to an escape passage, there being a variable restrictor controlling a by-pass for the throttle, when movement of the plunger beyond a predetermined limit occurs, and this by-pass varying the pressure drop across the throttle to cause a device to control the pump so that the original pressure drop is reestablished.

---

This invention relates to fuel flow control apparatus for gas turbine engines and is intended to control the supply of additional supplies of fuel for acceleration purposes.

The object of the invention is to provide apparatus of the kind referred to in a convenient form whereby the supply of additional fuel for acceleration purposes is related to the rate of acceleration required.

In accordance with the present invention, apparatus for controlling the supply of fuel to a gas turbine engine comprises a pump, a body containing an axially movable throttle for controlling the delivery of fuel from the pump, means for maintaining a constant pressure drop across the throttle, by controlling the output of the pump, the throttle being connected to a piston in a cylinder, to one end of which fuel is, in use, supplied from the upstream side of the throttle, a manually operable plunger movable coaxially within the piston, relative axial movement between the plunger and the piston controlling the escape of fuel from said one end of the cylinder such that when the plunger is moved to initiate acceleration of the engine, the escape of fuel from said one end of the cylinder is cut off, the body defining a passage connecting opposite sides of the constant pressure drop maintaining means through a variable restrictor device, variation of which takes place in the event of movement of the plunger beyond a predetermined limit at a rate which is greater than the rate of travel of the piston in the same direction in consequence of a build up of pressure, resulting from prevention of escape of fuel from the cylinder, the variation in the restrictor device altering the pressure drop across the constant pressure drop maintaining means, thus causing it to vary the pump output until the constant pressure drop is again established.

The invention will now be described with reference to the accompanying drawings in which, FIGURE 1 is a diagrammatic representation of apparatus for controlling the flow of fuel to a gas turbine engine.

FIGURE 2 is a perspective view on an enlarged scale of the portion of the apparatus shown in FIGURE 1, and FIGURE 3 is a side elevation view of a portion of the apparatus.

As shown in FIGURE 1 the fuel system includes a swash-plate type pump 10 obtaining a supply of fuel from a reservoir (not shown) through a boost pump 11. The pump 10 has an hydraulic servomechanism 12 for varying the stroke and supplies fuel along a duct 13 to a body 14 in which is housed the apparatus forming the subject of this invention. From the body 14 leads a duct 15 to burners indicated at 16, in the engine.

Within the body 14 is slidably mounted a throttle 17 which is of rod like form, one end of which is provided with longitudinal tapered flutes, and this fluted portion is movable axially with respect to an annulus 18 formed in the body 14 between the inlet duct 13 and the outlet duct 15, so that the axial position of the throttle 17 controls the flow of fuel to the burners 16. There is provided in the duct 15, a pressurizing valve shown at 19, and a shut-off cock 20.

Connected to parallel with the throttle 17 is a device 21 for maintaining constant pressure drop across it, this device being of conventional form and having a diaphragm 22 to which the pressures at upstream and downstream of the throttle 17 are applied respectively, the diaphragm 22 operating a lever 23 carrying a valve closure member 24 which determines the escape of fuel from one side of the servomechanism 12 of the pump 10 to regulate its stroke.

The pressure at the diaphragm 22 obtained from the downstream side of the throttle 17 through a restricted passage 25 and is moreover modified in accordance with a signal provided by a device 26 which is sensitive to temperature conditions obtained from the engine. The temperature signal arrives at the device 26 through an electrical control 27 and is applied to a solenoid 28 controlling the position of a valve closure member 29 through a lever 30, this controlling flow of fuel through a passage 31 communicating with the chamber at the appropriate side of the diaphragm 22. When the valve closure member 29 is moved to permit flow through the passage 31 the restrictor in the passage 25 ensures that the pressure at the diaphragm 22 is a function of the pressure downstream of the throttle valve 17.

Moreover the position of the lever 23 is modified by a signal related to air pressure conditions obtaining at the compressor stage engine, in known manner, through a capsule assembly 32.

The throttle 17 has a tubular extension 33 terminating in a piston 34 axially movable in a cylinder 35 to one end of which adjacent to the tubular extension 33, fuel is admitted from the duct 13 on the upstream side of the throttle 10 through a passage 36 incorporating restrictions 37. The tubular extension 33 has an orifice 38 in its wall, which can communicate with a transverse passage 39 in a manually operable plunger 40 which when the gas turbine engine is fitted to an aircraft, is controlled by the pilot. The transverse passage 39 communicating with a bore 41 in the plunger 40, and the open opposite end of this bore 41 communicating through transverse openings 42 in the wall of the tubular extension 33 of the throttle with a duct 43 leading to the upstream side of the pump 10 or any other portion of the fuel system which is at a relatively low pressure.

The plunger 40 is axially movable with respect to the throttle 17 and piston 34, and has a cam portion 44 formed on it (see FIGURE 2) which is engageable with a corresponding cam portion 45 on the interior of the piston 34 when a predetermined travel of the plunger 40 with respect to the piston 34 takes place. Interengagement of the cam portions 44, 45 causes relative rotation of the plunger 40 with respect to the piston 34 and this causes a change in a variable restrictor which is associated with the plunger 40 and which is in the form of a sleeve 46 within which the plunger 40 can slide, there being inlet and outlet passages 47, 48 to this sleeve 46, these passages 47, 48 being connected at upstream and downstream sides respectively of the throttle 17. The plunger 40 incorporates a pair of recesses 49, 50 connected by a transverse passage 51, the recess 50 being of tapering form, and the arrangement being such that relative rotation between the plunger 40 and the sleeve 46, causes the restriction to the flow of fuel between the passages 47 and 48 to be varied.

In use, if the pilot wishes to accelerate the engine, he moves the plunger 40 to the right as shown in the drawings, thus cutting off the escape of fuel through the orifice 38, the transverse passage 39, the bore 41, and the duct 43, so that pressure builds up in the end of the cylinder 35. This causes the piston 34 to move in the same direction as the plunger 40, until the orifice 38 again registers with the transverse passage 39, this having the effect of moving the throttle 17 to a position with respect to the annulus 18 in which a greater quantity of fuel can be supplied to the engine.

Should the travel of the plunger 40 in relation to the piston 34 be sufficient for engagement between the cam portions 44, 45 to engage, then rotation of the plunger 40 with respect to the piston 34 and with respect to the sleeve 46 will take place. This will have the effect of reducing the restriction formed by the recesses 49, 50 in the sleeve 46, so that increased flow between the passage 47 and the passage 48 by-passing the throttle 17 will take place. This will have the effect of changing the pressure drop across the throttle 17 which is sensed by the device 21 so that a change in the pump stroke will occur. The flow through the passage 47 and 48 will therefore increase the supply of fuel to the engine, and the additional quantity of fuel thus supplied will only reduce to its original value or cease as the case may be, when the piston 34 has moved in the cylinder 35 to an extent to permit the cam portions 44, 45 to disengage, and when the piston 34 has moved to a position in which the orifice 38 will again register with the transverse passage 39 in the plunger 40, thus again permitting the escape of fuel from the end of the cylinder 35.

The apparatus further incorporates a device connected to the tubular extension 33 of the throttle 17, whereby an initial angular movement of the throttle about its axis is imparted in relation to the plunger 40. The extent of this movement is determined in accordance with the speed of the engine to be controlled. This device, which is illustrated in FIGURE 3, comprises a cam 52 connected to the tubular extension 33, and of any convenient shape, and engageable with a roller 53 which is mounted on a spindle 54 in the body 14. Since the position of the throttle 17 and therefore the axial position of the tubular extension 33 in relation to the roller 53 is a measure of the speed of the engine, the relative angular positions of the piston 34 and the plunger 40 are thus determined and the magnitude of the travel of the plunger 40 before the cam portions 44, 45 engage, is also therefore determined in accordance with the speed of the engine.

Having thus described my invention what I claim as new and desire to secure by Letters Patent is:

1. Apparatus for controlling the supply of fuel to a gas turbine engine comprises a pump, a body containing an axially movable throttle for controlling the delivery of fuel from the pump, means for maintaining a constant pressure drop across the throttle, by controlling the output of the pump, the throttle being connected to a piston in a cylinder, to one end of which fuel is, in use, supplied from the upstream side of the throttle, a manually operable plunger movable coaxially within the piston, relative axial movement between the plunger and the piston controlling the escape of fuel from said one end of the cylinder such that when the plunger is moved to initiate acceleration of the engine, the escape of fuel from said one end of the cylinder is cut off, the body defining a passage connecting opposite sides of the constant pressure drop maintaining means through a variable restrictor device, variation of which takes place in the event of movement of the plunger beyond a predetermined limit at a rate which is greater than the rate of travel of the piston in the same direction in consequence of a build up of pressure, resulting from prevention of escape of fuel from the cylinder, the variation in the restrictor device altering the pressure drop across the constant pressure drop maintaining means, thus causing it to vary the pump output until the constant pressure drop is again established.

2. Apparatus for controlling the supply of fuel to a gas turbine engine comprises a pump, a body containing an axially movable throttle for controlling the delivery of fuel from the pump, means for maintaining a constant pressure drop across the throttle, by controlling the output of the pump, the throttle being connected to a piston in a cylinder, to one end of which fuel is, in use, supplied from the upstream side of the throttle, a manually operable plunger movable coaxially within the piston, relative axial movement between the plunger and the piston controlling the escape of fuel from said one end of the cylinder such that when the plunger is moved to initiate acceleration of the engine, the escape of fuel from said one end of the cylinder is cut off, the body defining a passage connecting opposite sides of the constant pressure drop maintaining means through a variable restrictor device, variation of which takes place in the event of movement of the plunger beyond a predetermined limit at a rate which is greater than the rate of travel of the piston in the same direction in consequence of a build up of pressure, resulting from prevention of escape of fuel from the cylinder, the variation in the restrictor device altering the pressure drop across the constant pressure drop maintaining means, thus causing it to vary the pump output until the constant presure drop is again established, the variable restrictor being so constructed that relative rotation between the plunger and the piston takes place when movement of the plunger beyond said predetermined limit occurs, such relative rotation creating a variation in the restriction to flow offered by said restrictor.

3. Apparatus as claimed in claim 2 in which the angular position of the plunger about its axis with respect to the piston is determined, before said predetermined limit of the plunger is reached in accordance with a signal related to speed of the engine.

4. Apparatus as claimed in claim 2 in which relative rotation between the plunger and the piston, after said predetermined limit has been reached, is created by engagement of cams carried on the plunger and piston respectively.

References Cited

UNITED STATES PATENTS

| | | | |
|---|---|---|---|
| 2,621,632 | 12/1952 | Afield | 91—48 |
| 2,685,334 | 8/1954 | Davies | 60—39.28 XR |
| 3,173,468 | 3/1965 | McCombs | 60—39.28 XR |

JULIUS E. WEST, *Primary Examiner.*